United States Patent
Zhang

(10) Patent No.: US 12,426,004 B2
(45) Date of Patent: Sep. 23, 2025

(54) PRS RESOURCE INDICATION METHOD AND APPARATUS IN SIDELINK COMMUNICATION, STORAGE MEDIUM AND TERMINAL

(71) Applicant: SPREADTRUM COMMUNICATIONS (SHANGHAI) CO., LTD., Shanghai (CN)

(72) Inventor: Meng Zhang, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 372 days.

(21) Appl. No.: 18/027,856

(22) PCT Filed: Sep. 7, 2021

(86) PCT No.: PCT/CN2021/116806
§ 371 (c)(1),
(2) Date: Mar. 22, 2023

(87) PCT Pub. No.: WO2022/062891
PCT Pub. Date: Mar. 31, 2022

(65) Prior Publication Data
US 2023/0362868 A1   Nov. 9, 2023

(30) Foreign Application Priority Data
Sep. 23, 2020   (CN) ............ 202011008792.9

(51) Int. Cl.
H04W 64/00   (2009.01)
H04L 5/00   (2006.01)
(Continued)

(52) U.S. Cl.
CPC ........... *H04W 64/00* (2013.01); *H04L 5/0051* (2013.01); *H04W 72/1263* (2013.01); *H04W 72/25* (2023.01)

(58) Field of Classification Search
CPC . H04W 64/00; H04W 72/1263; H04W 72/25; H04W 4/70; H04L 5/0051; H04L 5/0044; H04L 5/0094; H04L 5/0053
(Continued)

(56) References Cited

U.S. PATENT DOCUMENTS 11,960,021 B2 *   4/2024   Ko .......................... G01S 5/06
12,035,203 B2 *   7/2024   Kwak ................... H04W 92/18
(Continued)

FOREIGN PATENT DOCUMENTS

CN   109842934 A   6/2019
CN   110536234 A   12/2019
(Continued)

OTHER PUBLICATIONS

EPO Extended European Search Report for corresponding EP Application No. 21871263.6; Issued Feb. 15, 2024; 10 pages.
(Continued)

*Primary Examiner* — Mahendra R Patel
(74) *Attorney, Agent, or Firm* — CANTOR COLBURN LLP

(57) ABSTRACT

A Positioning Reference Signal (PRS) resource indication method and apparatus in sidelink communication, a storage medium and a terminal are provided. The method includes: sending resource indication information to a receiving User Equipment (UE), to enable the receiving UE to acquire a target position of a PRS resource based on the resource indication information and preset information to receive a PRS at the target position; wherein the resource indication information indicates a position of the PRS resource and/or
(Continued)

a position of a Physical Sidelink Shared Channel (PSSCH) resource, and the preset information includes at least a relationship between the PSSCH resource and the PRS resource.

15 Claims, 3 Drawing Sheets

(51) Int. Cl.
*H04W 72/1263* (2023.01)
*H04W 72/25* (2023.01)

(58) Field of Classification Search
USPC ........................................................ 455/456.1
See application file for complete search history.

(56) References Cited

U.S. PATENT DOCUMENTS

| | | | | |
|---|---|---|---|---|
| 2016/0095080 A1* | 3/2016 | Khoryaev | ............. | G01S 5/0284 |
| | | | | 455/456.1 |
| 2020/0359367 A1* | 11/2020 | Tang | ..................... | H04L 5/0048 |
| 2022/0085920 A1* | 3/2022 | Baldemair | ............ | H04L 1/1861 |
| 2022/0103292 A1* | 3/2022 | Hwang | ................. | H04L 1/1812 |
| 2022/0116168 A1* | 4/2022 | Lee | ........................ | H04W 56/00 |
| 2022/0159625 A1* | 5/2022 | Park | ........................ | H04W 72/20 |
| 2022/0174641 A1* | 6/2022 | Cha | .......................... | H04L 5/005 |
| 2023/0164815 A1* | 5/2023 | Liu | ......................... | H04L 5/0044 |
| | | | | 370/329 |

FOREIGN PATENT DOCUMENTS

| | | | |
|---|---|---|---|
| CN | 110661601 A | 1/2020 | |
| CN | 111669257 A | 9/2020 | |
| EP | 4017035 A1 | 6/2022 | |
| WO | WO-2015160158 A1 * | 10/2015 | ........... G01S 5/0289 |
| WO | WO-2017188547 A1 * | 11/2017 | ............... G01S 5/00 |
| WO | WO-2018030854 A1 * | 2/2018 | ........... H04L 1/1642 |
| WO | WO-2019153129 A1 * | 8/2019 | ........... G01S 5/0236 |
| WO | 2020033088 A1 | 2/2020 | |
| WO | WO-2020139051 A1 * | 7/2020 | ........... H04L 5/0048 |
| WO | WO-2020153709 A1 * | 7/2020 | ........... H04L 1/0026 |
| WO | 2020159339 A1 | 8/2020 | |
| WO | 2020177521 A1 | 9/2020 | |
| WO | WO-2020231130 A1 * | 11/2020 | |

OTHER PUBLICATIONS

International Search Report for corresponding International Application No. PCT/CN2021/116806; Mailing Date, Nov. 26, 2021.

* cited by examiner

S401 a sending UE sends resource indication information to a receiving UE, to enable the receiving UE to acquire a target position of a PRS resource based on the resource indication information and preset information to receive a PRS at the target position

PRS RESOURCE INDICATION METHOD AND APPARATUS IN SIDELINK COMMUNICATION, STORAGE MEDIUM AND TERMINAL

CROSS REFERENCE TO RELATED APPLICATIONS

This is the U.S. national stage of application No. PCT/CN2021/116806, filed on Sep. 7, 2021. Priority under 35 U.S.C. § 119(a) and 35 U.S.C. § 365(b) is claimed from Chinese Application No. 202011008792.9, filed Sep. 23, 2020, the disclosure of which is also incorporated herein by reference.

TECHNICAL FIELD

The present disclosure generally relates to communication technology field, and more particularly, to a Positioning Reference Signal (PRS) resource indication method and apparatus in sidelink communication, a storage medium, and a terminal.

BACKGROUND

Research on New Radio (NR) sidelink communication has been introduced in the 3rd Generation Partnership Project (3GPP) Release 16 (R16) and is mainly applicable to vehicular communication scenarios. In addition, positioning research on an interface between NR UE and UMTS Terrestrial Radio Access Network (UTRAN) (UU) also has been introduced in 3GPP R16.

Due to a need for Vehicle-to-Everything (V2X) communication, it is very likely that positioning research will be conducted on sidelink in the future. Specifically, there may be a distinction between relative and absolute location positioning. In addition, for communication scenarios of sidelink, discussions will be provided on In-Coverage (IC), partial-coverage and out-of-coverage, respectively.

There are many candidate positioning technologies that can be used on sidelink, including but not limited to Observed Time Difference of Arrival (OTDOA), positioning based on angle of reception/angle of emission (AoA/AoD) and Multiple Round Trip Time (Multi-RTT) positioning method and so on.

SUMMARY

Embodiments of the present disclosure provide a PRS resource indication method in sidelink communication to support positioning research on sidelink communication.

In an embodiment of the present disclosure, a PRS resource indication method in sidelink communication is provided, including: sending resource indication information to a receiving User Equipment (UE), to enable the receiving UE to acquire a target position of a PRS resource based on the resource indication information and preset information to receive a PRS at the target position; wherein the resource indication information indicates a position of the PRS resource and/or a position of a Physical Sidelink Shared Channel (PSSCH) resource, and the preset information includes at least a relationship between the PSSCH resource and the PRS resource.

In an embodiment of the present disclosure, a storage medium having computer instructions stored therein is provided, wherein when the computer instructions are executed, the above method is performed.

In an embodiment of the present disclosure, a UE including a memory and a processor is provided, wherein the memory has computer instructions stored therein, and when the processor executes the computer instructions, the above method is performed.

DETAILED DESCRIPTION

As described in the background, an indication method for PRS has not been introduced in sidelink communication, and positioning research cannot be carried out on sidelink communication.

In embodiments of the present disclosure, a PRS resource indication method in sidelink communication is provided, including: receiving resource indication information sent by a sending UE, wherein the resource indication information indicates a position of a PRS resource and/or a position of a PSSCH resource; and acquiring a target position of the PRS resource based on the resource indication information and preset information, to receive a PRS at the target position; wherein the preset information at least includes a relationship between the position of the PSSCH resource and the position of the PRS resource.

Embodiments of the present disclosure provide the PRS resource indication method in sidelink communication to support positioning research on sidelink communication.

In order to clarify the objects, characteristics and advantages of the disclosure, embodiments of present disclosure will be described in detail in conjunction with accompanying drawings.

Figure 1:
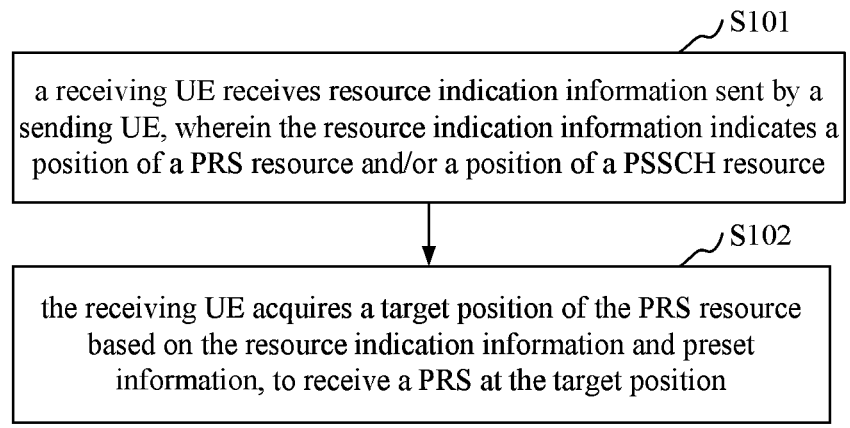
FIG. 1 is a flow chart of a PRS resource indication method in sidelink communication according to an embodiment.

Referring to FIG. 1, FIG. 1 is a flow chart of a PRS resource indication method in sidelink communication according to an embodiment. The method includes S101 and S102.

In S101, a receiving UE receives resource indication information sent by a sending UE, wherein the resource indication information indicates a position of a PRS resource and/or a position of a Physical Sidelink Shared Channel (PSSCH) resource.

In S102, the receiving UE acquires a target position of the PRS resource based on the resource indication information and preset information, to receive a PRS at the target position.

The preset information at least includes a relationship between the position of the PSSCH resource and the position of the PRS resource.

During sidelink communication between two UEs, one of the UEs sends resource indication information to the other UE, to indicate a position of a resource used to send the PRS, that is, the target position of the PRS resource. In this case, the UE that sends the resource indication information is referred to as the sending UE, and the UE that receives the resource indication information is referred to as the receiving UE. The method illustrated in FIG. 1 is performed by the receiving UE.

The PRS resource refers to the resource used by the sending UE to send the PRS, and the target position of the resource in a resource pool is determined by a frequency domain position and a time domain position of the resource.

The receiving UE determines the target position of the PRS resource based on the received resource indication information and preset information (information defined by a standard and/or configured by high-layer signaling), so as to receive the PRS at the target position.

In some embodiments, the resource indication information is used to indicate a frequency domain position of the PRS resource and/or a frequency domain position of the PSSCH resource, and each frequency domain position includes a frequency domain start position and/or a frequency domain bandwidth.

The frequency domain bandwidth is a frequency domain width occupied by the resource, and the frequency domain position of the resource may be determined based on the frequency domain starting position and the frequency domain bandwidth of the resource. Granularity of the frequency domain bandwidth may be a Resource Block (RB), a Resource Element (RE), or a subchannel.

Optionally, time domain positions of the PRS and the PSSCH may completely overlap or partially overlap. That is, the time domain position of the PRS resource may be determined according to the time domain position of the PSSCH.

Therefore, the resource indication information in the disclosure may be merely related to the frequency domain position of the PRS resource, and other information such as the time domain position and a frequency domain resource size of the PRS resource are configured by high-layer signaling or defined by a standard, that is, determined based on preset information. The frequency domain resource size may be several subchannels, several RBs, or several REs, where one subchannel consists of several RBs.

The resource indication information may separately indicate the frequency domain position of the PRS resource, or separately indicate the frequency domain position of the PSSCH resource. In this case, the relationship between the frequency domain position of the PSSCH resource and the frequency domain position of the PRS resource is determined by preset information. Alternatively, the resource indication information may indicate both the frequency domain position of the PRS resource and the frequency domain position of the PSSCH resource.

That is, at least one of the frequency domain position of the PSSCH resource, the frequency domain position of the PRS resource, or the total frequency domain position occupied by the PSSCH resource and the PRS resource needs to be indicated in the resource indication information. Accordingly, the receiving UE can acquire the frequency domain position of the PRS resource based on the frequency domain position of the PSSCH resource or acquire the frequency domain position of the PSSCH resource based on the frequency domain position of the PRS resource or acquire the frequency domain position of the PRS resource and/or the frequency domain position of the PSSCH resource based on the total frequency domain position occupied by the PSSCH resource and the PRS resource.

Optionally, the resource indication information indicates the frequency domain position of the PRS resource and/or the frequency domain position of the PSSCH resource by a preset number of bits.

A preset number of bits may be reserved in the resource indication information to indicate the frequency domain position of the PRS resource and/or the frequency domain position of the PSSCH resource. When the resource indication information merely indicates a portion of the frequency domain position information of the PRS resource and/or the frequency domain position of the PSSCH resource, rest of the information may be determined by the preset information.

In some embodiments, the relationship between the frequency domain position of the PSSCH resource and the frequency domain position of the PRS resource includes: the frequency domain position of the PSSCH resource and the frequency domain position of the PRS resource being consecutive, or there being a preset offset between the frequency domain position of the PSSCH resource and the frequency domain position of the PRS resource.

There may be an offset in a frequency domain between the PRS resource and the PSSCH resource, and granularity of the offset may be RB, RE, or subchannel.

Optionally, the preset information is configured by high-layer signaling which includes at least one of LPP, RRC signaling, MAC-CE, PC5-RRC signaling, or PC5-MAC-CE.

The PC5-RRC signaling, and PC5-MAC-CE are RRC signaling, and MAC-CE sent via a PC5 interface, respectively.

By the PRS resource indication method in sidelink communication provided in the embodiments of the present disclosure, two UEs connected by sidelink can coordinate transmission resources of PRS, so that the PRS can be accurately received by the receiving UE which then conducts positioning research on sidelink communication based on an OTDOA, AoA/AoD positioning method or a Multi-RTT positioning method.

In some embodiments, the resource indication information is carried by SCI.

That is, the sending UE sends the resource indication information to the receiving UE through the SCI. The resource indication information may be sent by the SCI for scheduling the PRS, or by a Physical Sidelink Control Channel (PSCCH).

Optionally, when the SCI carries the resource indication information which indicates both the frequency domain position of the PSSCH resource and the frequency domain position of the PRS resource, the resource indication information may occupy two data fields, one of which indicates the frequency domain position of the PS SCH resource following, and the other of which indicates the frequency domain position of the PRS resource following.

Optionally, the SCI includes a first stage SCI (first stage SCI, 1st SCI) and/or a second stage SCI (second stage SCI, 2nd SCI).

The first stage SCI may be carried by a PSCCH, and the second stage SCI may be carried by a PSSCH.

Optionally, the resource indication information may be carried merely by the first stage SCI, or merely by the second stage SCI, or partially by the first stage SCI and partially by the second stage SCI. For example, the frequency domain starting position of the PRS resource and/or the frequency domain starting position of the PSCCH resource may be carried by the first stage SCI, and the frequency domain bandwidth of the PRS resource may be carried by the second stage SCI. Alternatively, the frequency domain position of the PSSCH resource may be carried by the first stage SCI, and the frequency domain position of the PRS resource may be carried by the second stage SCI.

It should be noted that which content of the resource indication information the first stage SCI and the second stage SCI respectively carry can be adjusted according to needs and is not limited to the above embodiments.

Figure 2:
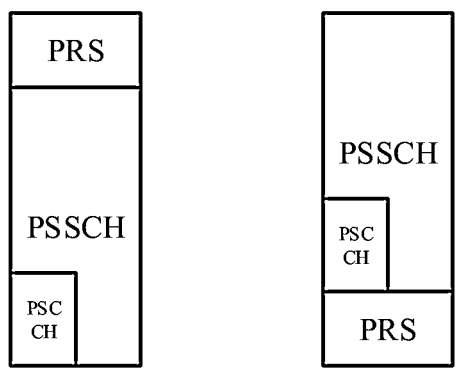
FIG. 2 is a diagram of a position relation of frequency resources according to an embodiment.

Referring to FIG. 2, FIG. 2 is a diagram of a position relation of frequency resources according to an embodiment. In the embodiment, a frequency domain position of a PSSCH resource and a frequency domain position of a PRS resource are consecutive, which specifically includes two situations illustrated at left and right respectively in FIG. 2. In the left diagram of FIG. 2, a PRS occupies a frequency domain resource above a PSSCH, while in the right diagram of FIG. 2, the PRS occupies a frequency domain resource below the PSSCH. In the embodiment, the resource indication information is carried by SCI, and the SCI is carried by a PSCCH. Positions of a frequency domain resource of the PSCCH, a frequency domain resource of the PSSCH, and a frequency domain resource of the PRS are shown in FIG. 2.

Figures 3, 4:
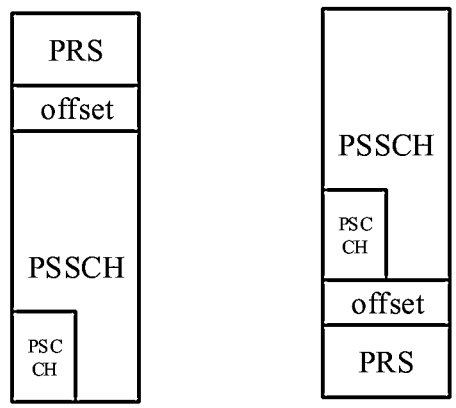
FIG. 3 is a diagram of a position relation of frequency resources according to an embodiment.
FIG. 4 is a flow chart of a PRS resource indication method in sidelink communication according to an embodiment.

Referring to FIG. 3, FIG. 3 is a diagram of a position relation of frequency resources according to an embodiment. A difference between FIG. 3 and FIG. 2 lies in that there is a certain offset between the frequency domain resource of the PRS and the frequency domain resource of the PSSCH. Optionally, the offset may be indicated in resource indication information, or determined based on preset information.

Optionally, the first stage SCI (1st SCI) or the second stage SCI (2nd SCI) indicates a frequency domain position of a resource for next one or more PRS transmissions, which may include a frequency domain bandwidth of a PRS resource or may not include the frequency domain bandwidth of the PRS resource. If the frequency domain bandwidth of the PRS resource is not included, the bandwidth may be acquired or estimated based on preset information.

Optionally, the first stage SCI (1st SCI) or the second stage SCI (2nd SCI) indicates whether there is PRS transmission in next one or more schedulings. For example, the presence or absence of the PRS transmission may be indicated by means of a bitmap, and each bit in the bitmap corresponds to one subsequent scheduled transmission.

In the above embodiments, the SCI is used to carry the resource indication information, so that the UE that receives the SCI can acquire the position of the PRS resource (such as the frequency domain position) based on the SCI and/or other information. The SCI may be SCI for scheduling the PRS, or SCI for scheduling the PSSCH, or SCI for scheduling both the PRS and the PSSCH.

Referring to FIG. 4, FIG. 4 is a flow chart of a PRS resource indication method in sidelink communication according to an embodiment. The method includes S401.

In S401, a sending UE sends resource indication information to a receiving UE, to enable the receiving UE to acquire a target position of a PRS resource based on the resource indication information and preset information to receive a PRS at the target position.

The resource indication information indicates a position of the PRS resource and/or a position of a PSSCH resource, and the preset information includes at least a relationship between the PSSCH resource and the PRS resource.

Optionally, the resource indication information indicates a frequency domain position of the PRS resource and/or a frequency domain position of the PS SCH resource, and each frequency domain position includes a frequency domain starting position and/or a frequency domain bandwidth.

Optionally, the resource indication information indicates the frequency domain position of the PRS resource and/or the frequency domain position of the PSSCH resource by a preset number of bits.

Optionally, the preset information is configured by high-layer signaling which includes at least one of LPP, RRC signaling, MAC-CE, PC5-RRC signaling, or PC5-MAC-CE.

Optionally, the resource indication information is carried by SCI.

Optionally, the SCI includes first stage SCI and/or second stage SCI.

Optionally, the position of the PSSCH resource and the position of the PRS resource are consecutive.

Optionally, there is a preset offset between the position of the PSSCH resource and the position of the PRS resource.

The method as shown in FIG. 4 is performed by the sending UE in sidelink communication. More details of working principles and working modes of the method as shown in FIG. 4 can be referred to related descriptions of the sending UE in the method as shown in FIGS. 1 to 3 and are not repeated here.

Figure 5:
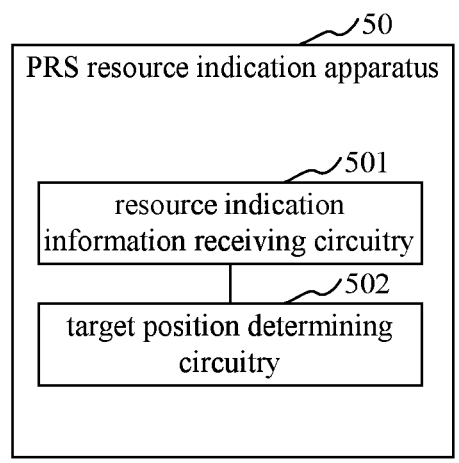
FIG. 5 is a structural diagram of a PRS resource indication apparatus in sidelink communication according to an embodiment.

Referring to FIG. 5, FIG. 5 is a structural diagram of a PRS resource indication apparatus 50 in sidelink communication according to an embodiment. The apparatus 50 includes a resource indication information receiving circuitry 501 and a target position determining circuitry 502.

The resource indication information receiving circuitry 501 is configured to receive resource indication information sent by a sending UE, wherein the resource indication information indicates a position of a PRS resource and/or a position of a PS SCH resource.

The target position determining circuitry 502 is configured to acquire a target position of the PRS resource based on the resource indication information and preset information, to receive a PRS at the target position.

The preset information at least includes a relationship between the position of the PSSCH resource and the position of the PRS resource.

More details of working principles and working modes of the apparatus 50 as shown in FIG. 5 can be referred to related descriptions of the method as shown in FIGS. 1 to 3 and are not repeated here.

In some embodiments, the apparatus 50 may correspond to a chip with a communication function in a UE, or to a chip with a data processing function, such as a System-On-Chip (SOC) or a baseband chip, or to a chip module including a chip with a communication function in the UE, or to a chip module including a chip with a data processing function, or to the UE.

Figure 6:
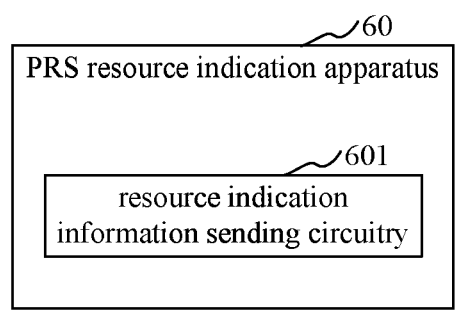
FIG. 6 is a structural diagram of a PRS resource indication apparatus in sidelink communication according to an embodiment.

Referring to FIG. 6, FIG. 6 is a structural diagram of a PRS resource indication apparatus 60 in sidelink communication according to an embodiment.

The apparatus 60 includes a resource indication information sending circuitry 601 configured to send resource indication information to a receiving UE, to enable the receiving UE to acquire a target position of a PRS resource based on the resource indication information and preset information to receive a PRS at the target position.

The resource indication information indicates a position of the PRS resource and/or a position of a PSSCH resource, and the preset information includes at least a relationship between the PSSCH resource and the PRS resource.

More details of working principles and working modes of the apparatus 60 as shown in FIG. 6 can be referred to related descriptions of the method as shown in FIG. 4, and are not repeated here.

In some embodiments, the apparatus 60 may correspond to a chip with a communication function in a UE, or to a chip with a data processing function, such as an SOC or a baseband chip, or to a chip module including a chip with a communication function in the UE, or to a chip module including a chip with a data processing function, or to the UE.

In some embodiments, each module/unit of each apparatus and product described in the above embodiments may be a software module/unit or a hardware module/unit or may be a software module/unit in part, and a hardware module/unit in part.

For example, for each apparatus or product applied to or integrated in a chip, each module/unit included therein may be implemented by hardware such as circuits; or, at least some modules/units may be implemented by a software program running on a processor integrated inside the chip, and the remaining (if any) part of the modules/units may be implemented by hardware such as circuits. For each apparatus or product applied to or integrated in a chip module, each module/unit included therein may be implemented by hardware such as circuits. Different modules/units may be disposed in a same component (such as a chip or a circuit module) or in different components of the chip module. Or at least some modules/units may be implemented by a software program running on a processor integrated inside the chip module, and the remaining (if any) part of the modules/units may be implemented by hardware such as circuits. For each apparatus or product applied to or integrated in a terminal, each module/unit included therein may be implemented by hardware such as circuits. Different modules/units may be disposed in a same component (such as a chip or a circuit module) or in different components of the terminal. Or at least some modules/units may be implemented by a software program running on a processor integrated inside the terminal, and the remaining (if any) part of the modules/units may be implemented by hardware such as circuits.

In an embodiment of the present disclosure, a storage medium having computer instructions stored therein is provided, wherein when the computer instructions are executed by a processor, the above method is performed. In some embodiments, the storage medium may be a computer readable storage medium, such as including a non-volatile or a non-transitory memory, or include an optical disk, a magnetic disk or a solid disk.

In the embodiments of the present disclosure, the processor may be a Central Processing Unit (CPU), or other general processors, Digital Signal Processors (DSPs), Application Specific Integrated Circuits (ASICs), Field Programmable Gate Arrays (FPGAs) or other Programmable logic devices, discrete gates or transistor logic devices, discrete hardware components, and the like. A general processor may be a microprocessor, or the processor may be any conventional processor or the like.

It should also be understood that the memory in the embodiments of the present disclosure may be either volatile memory or nonvolatile memory or may include both volatile and nonvolatile memories. The non-volatile memory may be a Read-Only Memory (ROM), a Programmable ROM (PROM), an Erasable PROM (EPROM), an electrically Erasable EPROM (EEPROM), or a flash memory. The volatile memory may be a Random Access Memory (RAM) which functions as an external cache. By way of example but not limitation, various forms of RAM are available, such as Static Random Access Memory (SRAM), Dynamic Random Access Memory (DRAM), Synchronous Dynamic Random Access Memory (SDRAM), Double Data Rate Synchronous Dynamic Random Access Memory (DDR SDRAM), Enhanced SDRAM (ESDRAM), Synchronous connection to DRAM (SLDRAM), and Direct Rambus RAM (DR-RAM).

In an embodiment of the present disclosure, a terminal including the apparatus 50 as shown in FIG. 5 or the apparatus 60 as shown in FIG. 6 or including a memory and a processor is provided, wherein the memory has computer instructions stored therein, and when the processor executes the computer instructions, the above method is performed. The terminal may include but not limited to a mobile phone, a computer, a tablet computer, a server or a server cluster.

A terminal in the embodiments of the present disclosure may refer to various forms of UE, access terminal, user unit, user station, Mobile Station (MS), remote station, remote terminal, mobile equipment, user terminal, terminal equipment, wireless communication equipment, user agent or user device. The terminal equipment may further be a cellular phone, a cordless phone, a Session Initiation Protocol (SIP) phone, a Wireless Local Loop (WLL) station, a Personal Digital Assistant (PDA), a handheld device with a wireless communication function, a computing device or other processing devices connected to a wireless modems, an in-vehicle device, a wearable device, a terminal equipment in the future 5G network, or a terminal equipment in a future evolved Public Land Mobile Network (PLMN), which is not limited in the embodiments of the present disclosure.

It should be understood that the term "and/or" in the present disclosure is merely an association relationship describing associated objects, indicating that there can be three types of relationships, for example, A and/or B can represent "A exists only, both A and B exist, B exists only. In addition, the character "/" in the present disclosure represents that the former and latter associated objects have an "or" relationship.

The "plurality" in the embodiments of the present disclosure refers to two or more.

The descriptions of the first, second, etc. in the embodiments of the present disclosure are merely for illustrating and differentiating the objects, and do not represent the order or the particular limitation of the number of devices in the embodiments of the present disclosure, which do not constitute any limitation to the embodiments of the present disclosure.

The "connection" in the embodiments of the present disclosure refers to various connection ways such as direct connection or indirect connection to realize communication between devices, which is not limited in the embodiments of the present disclosure.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A Positioning Reference Signal (PRS) resource indication method in sidelink communication, comprising:
  sending resource indication information to a receiving User Equipment (UE), to enable the receiving UE to acquire a target position of a PRS resource based on the resource indication information and preset information to receive a PRS at the target position;

wherein the resource indication information indicates a position of the PRS resource, and the preset information comprises at least a relationship between a Physical Sidelink Shared Channel (PSSCH) resource and the PRS resource, the resource indication information indicates a frequency domain position of the PRS resource, and each frequency domain position comprises a frequency domain starting position, and the resource indication information indicates the frequency domain position of the PRS resource by a preset number of bits.

2. The method according to claim 1, wherein the preset information is configured by high-layer signaling which comprises at least one of Long Term Evolution Positioning Protocol (LPP), Radio Resource Control (RRC) signaling, Medium Access Control Element (MAC-CE), PC5-RRC signaling, or PC5-MAC-CE.

3. The method according to claim 1, wherein the resource indication information is carried by SCI.

4. The method according to claim 3, wherein the SCI comprises first stage SCI and/or second stage SCI.

5. The method according to claim 1, wherein the position of the PSSCH resource and the position of the PRS resource are consecutive.

6. The method according to claim 1, wherein there is a preset offset between the position of the PSSCH resource and the position of the PRS resource.

7. A non-transitory storage medium storing one or more programs, the one or more programs comprising computer instructions, which, when executed by a processor, cause the processor to:

send resource indication information to a receiving User Equipment (UE), to enable the receiving UE to acquire a target position of a Positioning Reference Signal (PRS) resource based on the resource indication information and preset information to receive a PRS at the target position;

wherein the resource indication information indicates a position of the PRS resource, and the preset information comprises at least a relationship between a Physical Sidelink Shared Channel (PSSCH) resource and the PRS resource, the resource indication information indicates a frequency domain position of the PRS resource, and each frequency domain position comprises a frequency domain starting position, and the resource indication information indicates the frequency domain position of the PRS resource by a preset number of bits.

8. A terminal comprising a memory and a processor, wherein the memory stores one or more programs, the one or more programs comprising computer instructions, which, when executed by the processor, cause the processor to:

send resource indication information to a receiving User Equipment (UE), to enable the receiving UE to acquire a target position of a Positioning Reference Signal (PRS) resource based on the resource indication information and preset information to receive a PRS at the target position;

wherein the resource indication information indicates a position of the PRS resource, and the preset information comprises at least a relationship between a Physical Sidelink Shared Channel (PSSCH) resource and the PRS resource, the resource indication information indicates a frequency domain position of the PRS resource, and each frequency domain position comprises a frequency domain starting position, and the resource indication information indicates the frequency domain position of the PRS resource by a preset number of bits.

9. The terminal according to claim 8, wherein the preset information is configured by high-layer signaling which comprises at least one of Long Term Evolution Positioning Protocol (LPP), Radio Resource Control (RRC) signaling, Medium Access Control Element (MAC-CE), PC5-RRC signaling, or PC5-MAC-CE.

10. The terminal according to claim 8, wherein the resource indication information is carried by SCI.

11. The terminal according to claim 10, wherein the SCI comprises first stage SCI and/or second stage SCI.

12. The terminal according to claim 8, wherein the position of the PSSCH resource and the position of the PRS resource are consecutive.

13. The terminal according to claim 8, wherein there is a preset offset between the position of the PSSCH resource and the position of the PRS resource.

14. The non-transitory storage medium according to claim 7, wherein the preset information is configured by high-layer signaling which comprises at least one of Long Term Evolution Positioning Protocol (LPP), Radio Resource Control (RRC) signaling, Medium Access Control Element (MAC-CE), PC5-RRC signaling, or PC5-MAC-CE.

15. The non-transitory storage medium according to claim 7, wherein the resource indication information is carried by SCI.

* * * * *